United States Patent
Forbes, Jr. et al.

(10) Patent No.: US 8,131,403 B2
(45) Date of Patent: Mar. 6, 2012

(54) SYSTEM AND METHOD FOR DETERMINING AND UTILIZING CUSTOMER ENERGY PROFILES FOR LOAD CONTROL FOR INDIVIDUAL STRUCTURES, DEVICES, AND AGGREGATION OF SAME

(75) Inventors: Joseph W. Forbes, Jr., Wake Forest, NC (US); Joel L. Webb, Raleigh, NC (US)

(73) Assignee: Consert, Inc., San Antonio, TX (US)

( * ) Notice: Subject to any disclaimer, the term of this patent is extended or adjusted under 35 U.S.C. 154(b) by 291 days.

(21) Appl. No.: 12/702,640

(22) Filed: Feb. 9, 2010

(65) Prior Publication Data
US 2010/0145534 A1    Jun. 10, 2010

Related U.S. Application Data

(63) Continuation-in-part of application No. 11/895,909, filed on Aug. 28, 2007, now Pat. No. 7,715,951.

(60) Provisional application No. 61/176,752, filed on May 8, 2009, provisional application No. 61/150,978, filed on Feb. 9, 2009.

(51) Int. Cl.
| | |
|---|---|
| G05D 3/12 | (2006.01) |
| G05D 5/00 | (2006.01) |
| G05D 9/00 | (2006.01) |
| G05D 11/00 | (2006.01) |
| G05D 17/00 | (2006.01) |
| G05B 11/01 | (2006.01) |
| G01R 21/00 | (2006.01) |
| G01R 21/06 | (2006.01) |
| G01R 23/165 | (2006.01) |

(52) U.S. Cl. ...................................................... 700/295
(58) Field of Classification Search .................. 700/22, 700/286, 291, 295; 702/61–62; 324/76.68, 324/76.77, 103 P
See application file for complete search history.

(56) References Cited

U.S. PATENT DOCUMENTS 3,906,242 A    9/1975    Stevenson
(Continued)

FOREIGN PATENT DOCUMENTS

EP    1729223    12/2006
(Continued)

OTHER PUBLICATIONS

PCT/US2010/034247, "International Search Report".
(Continued)

*Primary Examiner* — Ramesh Patel
(74) *Attorney, Agent, or Firm* — Womble Carlyle Sandridge & RIce, LLP

(57) ABSTRACT

A system and method for creating and making use of customer profiles, including energy consumption patterns. Devices within a service point, using the active load director, may be subject to control events, often based on customer preferences. These control events cause the service point to use less power. Data associated with these control events, as well as related environment data, are used to create an energy consumption profile for each service point. This can be used by the utility to determine which service points are the best targets for energy consumption. In addition, an intelligent load rotation algorithm determines how to prevent the same service points from being picked first each time the utility wants to conserve power.

46 Claims, 6 Drawing Sheets

U.S. PATENT DOCUMENTS

| | | | |
|---|---|---|---|
| 4,023,043 A | 5/1977 | Stevenson | |
| 4,589,075 A | 5/1986 | Buennagel | |
| 4,799,059 A | 1/1989 | Grindahl et al. | |
| 4,819,180 A | 4/1989 | Hedman et al. | |
| 5,237,507 A | 8/1993 | Chasek | |
| 5,388,101 A | 2/1995 | Dinkins | |
| 5,481,546 A | 1/1996 | Dinkins | |
| 5,502,339 A | 3/1996 | Hartig | |
| 5,570,002 A | 10/1996 | Castleman | |
| 5,592,491 A | 1/1997 | Dinkins | |
| 5,675,503 A | 10/1997 | Moe et al. | |
| 5,721,936 A | 2/1998 | Kikinis et al. | |
| 6,018,690 A | 1/2000 | Saito et al. | |
| 6,078,785 A * | 6/2000 | Bush | 455/7 |
| 6,102,487 A | 8/2000 | Ovrebo | |
| 6,115,676 A | 9/2000 | Rector et al. | |
| 6,233,327 B1 | 5/2001 | Petite | |
| 6,519,509 B1 | 2/2003 | Nierlich et al. | |
| 6,535,797 B1 * | 3/2003 | Bowles et al. | 700/286 |
| 6,601,033 B1 | 7/2003 | Sowinski | |
| 6,622,097 B2 * | 9/2003 | Hunter | 702/61 |
| 6,633,823 B2 * | 10/2003 | Bartone et al. | 702/57 |
| 6,681,154 B2 | 1/2004 | Nierlich et al. | |
| 6,687,574 B2 | 2/2004 | Pietrowicz et al. | |
| 6,732,055 B2 | 5/2004 | Bagepalli et al. | |
| 6,778,882 B2 * | 8/2004 | Spool et al. | 700/295 |
| 6,784,807 B2 | 8/2004 | Petite et al. | |
| 6,832,135 B2 * | 12/2004 | Ying | 700/295 |
| 6,836,737 B2 | 12/2004 | Petite et al. | |
| 6,862,498 B2 | 3/2005 | Davis et al. | |
| 6,865,450 B2 | 3/2005 | Masticola et al. | |
| 6,882,498 B2 * | 4/2005 | Kurumatani et al. | 360/83 |
| 6,891,838 B1 | 5/2005 | Petite et al. | |
| 6,904,336 B2 | 6/2005 | Raines et al. | |
| 6,906,617 B1 | 6/2005 | Van der Meulen | |
| 6,909,942 B2 | 6/2005 | Andarawis et al. | |
| 6,914,533 B2 | 7/2005 | Petite | |
| 6,914,893 B2 | 7/2005 | Petite | |
| 6,934,316 B2 | 8/2005 | Cornwall et al. | |
| 7,019,667 B2 | 3/2006 | Petite et al. | |
| 7,053,767 B2 | 5/2006 | Petite et al. | |
| 7,088,014 B2 | 8/2006 | Nierlich et al. | |
| 7,103,511 B2 | 9/2006 | Petite | |
| 7,123,994 B2 | 10/2006 | Weik et al. | |
| 7,133,750 B2 | 11/2006 | Raines et al. | |
| 7,181,320 B2 | 2/2007 | Whiffen et al. | |
| 7,184,861 B2 | 2/2007 | Petite | |
| 7,200,134 B2 | 4/2007 | Proctor, Jr. et al. | |
| 7,206,670 B2 | 4/2007 | Pimputkar et al. | |
| 7,209,804 B2 * | 4/2007 | Curt et al. | 700/286 |
| 7,209,840 B2 | 4/2007 | Petite et al. | |
| 7,233,843 B2 * | 6/2007 | Budhraja et al. | 700/291 |
| 7,263,073 B2 | 8/2007 | Petite et al. | |
| 7,274,975 B2 | 9/2007 | Miller | |
| 7,289,887 B2 * | 10/2007 | Rodgers | 700/295 |
| 7,295,128 B2 | 11/2007 | Petite | |
| 7,305,282 B2 | 12/2007 | Chen | |
| 7,313,465 B1 | 12/2007 | O'Donnell | |
| 7,343,341 B2 | 3/2008 | Sandor et al. | |
| 7,345,998 B2 | 3/2008 | Cregg et al. | |
| 7,346,463 B2 | 3/2008 | Petite et al. | |
| 7,397,907 B2 | 7/2008 | Petite | |
| 7,406,364 B2 | 7/2008 | Andren et al. | |
| 7,412,304 B2 | 8/2008 | Uenou | |
| 7,424,527 B2 | 9/2008 | Petite | |
| 7,440,871 B2 | 10/2008 | McConnell et al. | |
| 7,468,661 B2 | 12/2008 | Petite et al. | |
| 7,480,501 B2 | 1/2009 | Petite | |
| 7,528,503 B2 | 5/2009 | Rognli et al. | |
| 7,536,240 B2 | 5/2009 | McIntyre et al. | |
| 7,541,941 B2 | 6/2009 | Bogolea et al. | |
| 7,565,227 B2 | 7/2009 | Richard et al. | |
| 7,650,425 B2 | 1/2010 | Davis et al. | |
| 7,697,492 B2 | 4/2010 | Petite | |
| 7,711,796 B2 | 5/2010 | Gutt et al. | |
| 7,715,951 B2 * | 5/2010 | Forbes et al. | 700/291 |
| 7,738,999 B2 | 6/2010 | Petite | |
| 7,739,378 B2 | 6/2010 | Petite | |
| 2001/0038343 A1 | 11/2001 | Meyer et al. | |
| 2002/0019802 A1 | 2/2002 | Malme et al. | |
| 2002/0035496 A1 | 3/2002 | Fukushima et al. | |
| 2002/0109607 A1 | 8/2002 | Cumeralto et al. | |
| 2002/0138176 A1 * | 9/2002 | Davis et al. | 700/286 |
| 2002/0143693 A1 | 10/2002 | Soestbergen et al. | |
| 2003/0009705 A1 | 1/2003 | Thelander et al. | |
| 2003/0036820 A1 | 2/2003 | Yellepeddy | |
| 2003/0083980 A1 | 5/2003 | Satake | |
| 2003/0144864 A1 | 7/2003 | Mazzarella | |
| 2003/0229572 A1 | 12/2003 | Raines et al. | |
| 2004/0006439 A1 | 1/2004 | Hunter | |
| 2004/0088083 A1 | 5/2004 | Davis et al. | |
| 2004/0095237 A1 | 5/2004 | Chen et al. | |
| 2004/0128266 A1 * | 7/2004 | Yellepeddy et al. | 705/412 |
| 2004/0153170 A1 | 8/2004 | Santacatterina et al. | |
| 2004/0158478 A1 * | 8/2004 | Zimmerman | 705/1 |
| 2004/0162793 A1 | 8/2004 | Scott et al. | |
| 2004/0193329 A1 * | 9/2004 | Ransom et al. | 700/286 |
| 2004/0230533 A1 | 11/2004 | Benco | |
| 2005/0033481 A1 | 2/2005 | Budhraja et al. | |
| 2005/0065742 A1 | 3/2005 | Rodgers | |
| 2005/0096856 A1 | 5/2005 | Lubkeman et al. | |
| 2005/0096857 A1 | 5/2005 | Hunter | |
| 2005/0125243 A1 | 6/2005 | Villalobos | |
| 2005/0192711 A1 | 9/2005 | Raines et al. | |
| 2005/0192713 A1 * | 9/2005 | Weik et al. | 700/295 |
| 2005/0216302 A1 | 9/2005 | Raji et al. | |
| 2005/0216580 A1 | 9/2005 | Raji et al. | |
| 2005/0234600 A1 | 10/2005 | Boucher et al. | |
| 2005/0240314 A1 * | 10/2005 | Martinez | 700/286 |
| 2005/0240315 A1 * | 10/2005 | Booth et al. | 700/295 |
| 2005/0246190 A1 | 11/2005 | Sandor et al. | |
| 2005/0267642 A1 | 12/2005 | Whiffen et al. | |
| 2006/0020544 A1 | 1/2006 | Kaveski | |
| 2006/0022841 A1 | 2/2006 | Hoiness et al. | |
| 2006/0025891 A1 * | 2/2006 | Budike, Jr. | 700/275 |
| 2006/0031934 A1 | 2/2006 | Kriegel | |
| 2006/0106635 A1 | 5/2006 | Ulrich et al. | |
| 2006/0142961 A1 | 6/2006 | Johnson et al. | |
| 2006/0161450 A1 | 7/2006 | Carey et al. | |
| 2006/0168191 A1 | 7/2006 | Ives | |
| 2006/0195334 A1 | 8/2006 | Reeb et al. | |
| 2006/0271244 A1 * | 11/2006 | Cumming et al. | 700/291 |
| 2006/0271314 A1 * | 11/2006 | Hayes | 702/62 |
| 2007/0021874 A1 | 1/2007 | Rognli et al. | |
| 2007/0058453 A1 | 3/2007 | Shaffer et al. | |
| 2007/0058629 A1 | 3/2007 | Luft | |
| 2007/0085702 A1 | 4/2007 | Walters et al. | |
| 2007/0100503 A1 * | 5/2007 | Balan et al. | 700/286 |
| 2007/0203722 A1 | 8/2007 | Richards et al. | |
| 2007/0204176 A1 | 8/2007 | Shaffer et al. | |
| 2007/0213878 A1 | 9/2007 | Chen | |
| 2007/0255457 A1 | 11/2007 | Whitcomb et al. | |
| 2007/0286210 A1 | 12/2007 | Gutt et al. | |
| 2008/0015976 A1 | 1/2008 | Sandor et al. | |
| 2008/0091625 A1 | 4/2008 | Kremen | |
| 2008/0130673 A1 | 6/2008 | Cregg et al. | |
| 2008/0147465 A1 | 6/2008 | Raines et al. | |
| 2008/0165714 A1 | 7/2008 | Dettinger et al. | |
| 2008/0172312 A1 * | 7/2008 | Synesiou et al. | 705/34 |
| 2008/0177678 A1 | 7/2008 | Di Martini | |
| 2008/0224892 A1 | 9/2008 | Bogolea et al. | |
| 2008/0231114 A1 | 9/2008 | Tolnar et al. | |
| 2008/0238710 A1 | 10/2008 | Tolnar et al. | |
| 2008/0255899 A1 | 10/2008 | McConnell et al. | |
| 2008/0281473 A1 | 11/2008 | Pitt | |
| 2009/0018884 A1 | 1/2009 | McConnell et al. | |
| 2009/0043519 A1 | 2/2009 | Bridges et al. | |
| 2009/0043520 A1 | 2/2009 | Pollack et al. | |
| 2009/0055031 A1 | 2/2009 | Slota et al. | |
| 2009/0062970 A1 | 3/2009 | Forbes, Jr. | |
| 2009/0063228 A1 | 3/2009 | Forbes, Jr. | |
| 2009/0112758 A1 | 4/2009 | Herzig | |
| 2009/0135836 A1 | 5/2009 | Veillette | |
| 2009/0187499 A1 | 7/2009 | Mulder et al. | |
| 2009/0240381 A1 | 9/2009 | Lane | |
| 2010/0106575 A1 | 4/2010 | Bixby et al. | |
| 2010/0191862 A1 | 7/2010 | Forbes, Jr. et al. | |

| | | | |
|---|---|---|---|
| 2010/0235008 | A1 | 9/2010 | Forbes, Jr. |
| 2011/0022239 | A1 | 1/2011 | Forbes, Jr. |
| 2011/0029655 | A1 | 2/2011 | Forbes, Jr. |
| 2011/0125422 | A1* | 5/2011 | Goncalves Jota et al. ...... 702/45 |
| 2011/0231320 | A1* | 9/2011 | Irving .......................... 705/80 |

FOREIGN PATENT DOCUMENTS

| | | |
|---|---|---|
| JP | 2000078748 | 3/2000 |
| JP | 2001306839 | 11/2001 |
| JP | 2004180412 | 6/2004 |
| JP | 2006060911 | 3/2006 |
| KR | 2005001584 | 1/2005 |
| WO | WO 2008125696 | 10/2008 |
| WO | WO 2009032161 | 3/2009 |
| WO | WO 2009032162 | 3/2009 |
| WO | WO 2010129059 | 11/2010 |
| WO | WO 2010129958 | 11/2010 |
| WO | WO 2010132456 | 11/2010 |
| WO | WO 2010132469 | 11/2010 |
| WO | WO 2010132477 | 11/2010 |
| WO | WO 2010134987 | 11/2010 |
| WO | WO 2011043818 | 4/2011 |
| WO | WO 2011046589 | 4/2011 |

OTHER PUBLICATIONS

PCT/US2010/034247, "Written Opinion of the International Searching Authority".

Inoue, et al. Network Architecture for Home Energy Management System, IEEE Transactions on Consumer Electronics, vol. 49, Issue 3, Aug. 2003, pp. 606-613 (8 pages).

Paul Darbee, INSTEON the Details, Smarthouse, Inc., Aug. 11, 2005, 68 pages.

Paul Darbee, INSTEON Compared, SmartLabs, Inc., Jan. 2, 2006, 69 pages.

Allowing for Household Preferences in Emission Trading, A Contribution to the Climate Policy Debate, Michael Ahlheim and Friedrich Schneider, Environmental and Resource Economics 21: 317-342, 2002 Kluwer Academic Publishers, Printed in the Netherlands (26 pages).

Environmental and economic benefits resulting from citizens' participation in CO2 emissions trading: An efficient alternative solution to the voluntary compensation of CO2 emissions, Olivier Rousse, Energy Policy 36 (2008) 388-397 (10 pages).

B.J. Kirby, Spinning Reserve from Responsive Loads, Oak Ridge National Laboratory, United States Dept. of Energy, Mar. 2003 (54 pages).

Eric Hirst and Brendan Kirby, Opportunities for Demand Participation in New England Contingency-Reserve Markets, New England Demand Response Initiative, Feb. 2003 (15 pages).

Pablo A. Ruiz and Peter W. Sauer, Valuation of Reserve Services, IEEE Proceedings of the $41^{st}$ Hawaii International Conference on System Sciences, 2008 (9 pages).

Eric Hirst and Richard Cowart, Demand Side Resources and Reliability, New England Demand Response Initiative, Mar. 20, 2002 (32 pages).

C.W. Gellings and W.M. Smith, Integrating Demand-Side Management into Utility Planning, Proceedings of the IEEE, vol. 77, Issue: 6, Jun. 1989, pp. 908-918 (Abstract only).

M. Rashidi-Nejad, Y.H. Song, and M.H. Javidi-Dasht-Bayaz, Operating Reserve Provision in Deregulated Power Markets, IEEE Power Engineering Society Winter Meeting, vol. 2, 2002, pp. 1305-1310 (Abstract only).

L.T. Anstine, R.E. Burke, J.E. Casey, R. Holgate, R.S. John, and H.G. Stewart, Application of Probability Methods to the Determination of Spinning Reserve Requirements for the Pennsylvania-New Jersey-Maryland Interconnection; IEEE Transactions on Power Apparatus and Systems, vol. 82, Issue 68, Oct. 1963, pp. 726-735 (Abstract only).

Zhu Jinxiang, G. Jordan, and S. Ihara, the Market for Spinning Reserve and Its Impacts on Energy Prices, IEEE Power Engineering Society Winter Meeting, vol. 2, 2000, pp. 1202-1207 (Abstract Only).

Kathleen Spees and Lester B. Lave, Demand Response and Electricity Market Efficiency, the Electricity Journal, vol. 20, Issue 3, Apr. 2007 (online Mar. 27, 2007), pp. 69-85 (Abstract only).

* cited by examiner

*This is not just a 3rd dimension. There could be many additional dimensions based on climate factors such as humidity, outside temperature, etc.*

SYSTEM AND METHOD FOR DETERMINING AND UTILIZING CUSTOMER ENERGY PROFILES FOR LOAD CONTROL FOR INDIVIDUAL STRUCTURES, DEVICES, AND AGGREGATION OF SAME

CROSS-REFERENCE TO RELATED APPLICATIONS

This application is a continuation-in-part of U.S. patent application Ser. No. 11/895,909, filed on Aug. 28, 2007. This application claims the benefit of provisional patent application Ser. No. 61/176,752, filed on May 8, 2009, and provisional patent application 61/150,978 filed on Feb. 9, 2009. The specification and drawings of the provisional patent applications are specifically incorporated by reference herein. This application is also related to commonly-owned U.S. patent application Ser. No. 12/001,819, filed on Dec. 13, 2007.

BACKGROUND OF THE INVENTION

1. Field of the Invention

The present invention relates generally to electrical power load control systems and, more particularly, to creating customer profiles using energy consumption patterns.

2. Description of Related Art

Customer profiles are often used by systems for a variety of reasons. One reason is to promote customer loyalty. This involves keeping information about not only the customer, but about the customer's actions as well. This may include information about what the customer owns (i.e., which devices), how they are used, when they are used, etc. By mining this data, a company can more effectively select rewards for customers that give those customers an incentive for continuing to do business with the company. This is often described as customer relationship management (CRM).

Customer profile data is also useful for obtaining feedback about how a product is used. In software systems, this is often used to improve the customer/user experience or as an aid to testing. Deployed systems that have customer profiling communicate customer actions and other data back to the development organization. That data is analyzed to understand the customer's experience. Lessons learned from that analysis is used to make modifications to the deployed system, resulting in an improved system.

Customer profile data may also be used in marketing and sales. For instance, a retail business may collect a variety of information about a customer, including what customers look at on-line and inside "brick-and-mortar" stores. This data is mined to try to identify customer product preferences and shopping habits. Such data helps sales and marketing determine how to present products of probable interest to the customer, resulting in greater sales.

However, the collection of customer profile information by power utilities has been limited to customer account information. Because power utilities typically are unable to collect detailed data about what is happening inside a customer's home or business, including patterns of energy consumption by device, there has been little opportunity to create extensive customer profiles.

SUMMARY OF THE INVENTION

Embodiments described herein utilize the Active Load Management System (ALMS) that is fully described in commonly-owned published patent application US 2009/0062970. The ALMS captures energy usage data at each service point and stores that data in a central database. This data describes all of the energy consumed by devices owned by each customer, as well as additional information, such as customer preferences. Other embodiments of the ALMS focus on use of this information in the calculation of carbon credits or for the trading of unused energy.

In one embodiment, a system and method are provided for creating and making use of customer profiles, including energy consumption patterns. Devices within a service point, using the active load director, may be subject to control events, often based on customer preferences. These control events cause the service point to use less power. Data associated with these control events, as well as related environment data, are used to create an energy consumption profile for each service point. This can be used by the utility to determine which service points are the best targets for energy consumption. In addition, an additional algorithm determines how to prevent the same service points from being picked first each time the utility wants to conserve power.

In one embodiment, a method is provided for determining and using customer energy profiles to manage electrical load control events on a communications network between a server in communication with an electric utility and a client device at each of a plurality of service points. A customer profile is generated at the server for each of a plurality of customers including at least energy consumption information for a plurality of controllable energy consuming devices at an associated service point. The plurality of customer profiles is stored in a database at the server for use in load control events. The plurality of customer profiles are aggregated into a plurality of groups based on at least one predetermined criterion. A candidate list of service points for load control events based on the predetermined criterion is generated at the server. A load control event is sent to at least one selected service point in the candidate list of service points in response to an energy reduction request including a target energy savings received from the electric utility via the communications network. An energy savings for the plurality of controllable energy consuming devices resulting from the load control event at the selected service point is determined at the server. The server determines if the resulting energy savings is at least equal to the target energy savings. The load control event is sent to at least one selected additional service point in the candidate list of service points in order to reach the target energy savings, if the target energy savings has not been reached.

In one embodiment, a system is provided for determining and using customer energy profiles to manage electrical load control events on a communications network between a server in communication with an electric utility and a client device at each of a plurality of service points. The system includes a memory storing a database containing a plurality of customer profiles for load control events wherein each customer profile includes at least energy consumption information for a plurality of controllable energy consuming devices at an associated service point; and a server processor, cooperative with the memory, and configured for managing electrical load control events on the communications network to the plurality of service points by: generating a customer profile for each of a plurality of customers; aggregating the plurality of customer profiles into a plurality of groups based on at least one predetermined criterion; generating a candidate list of service points for load control events based on the predetermined criterion; sending a load control event to at least one selected service point in the candidate list of service points in response to an energy reduction request including a target energy savings received from the electric utility via the communications network; determining an energy savings for the plurality of controllable energy consuming devices resulting from the load control event at the selected service point; determining if the resulting energy savings is at least equal to the target energy savings; and sending the load control event to at least one selected additional service point in the candidate list of service points in order to reach the target energy savings.

BRIEF DESCRIPTION OF THE DRAWINGS

These and other advantages and aspects of the embodiments of the invention will become apparent and more readily appreciated from the following detailed description of the embodiments taken in conjunction with the accompanying drawings, as follows.

DETAILED DESCRIPTION

Figure 1:
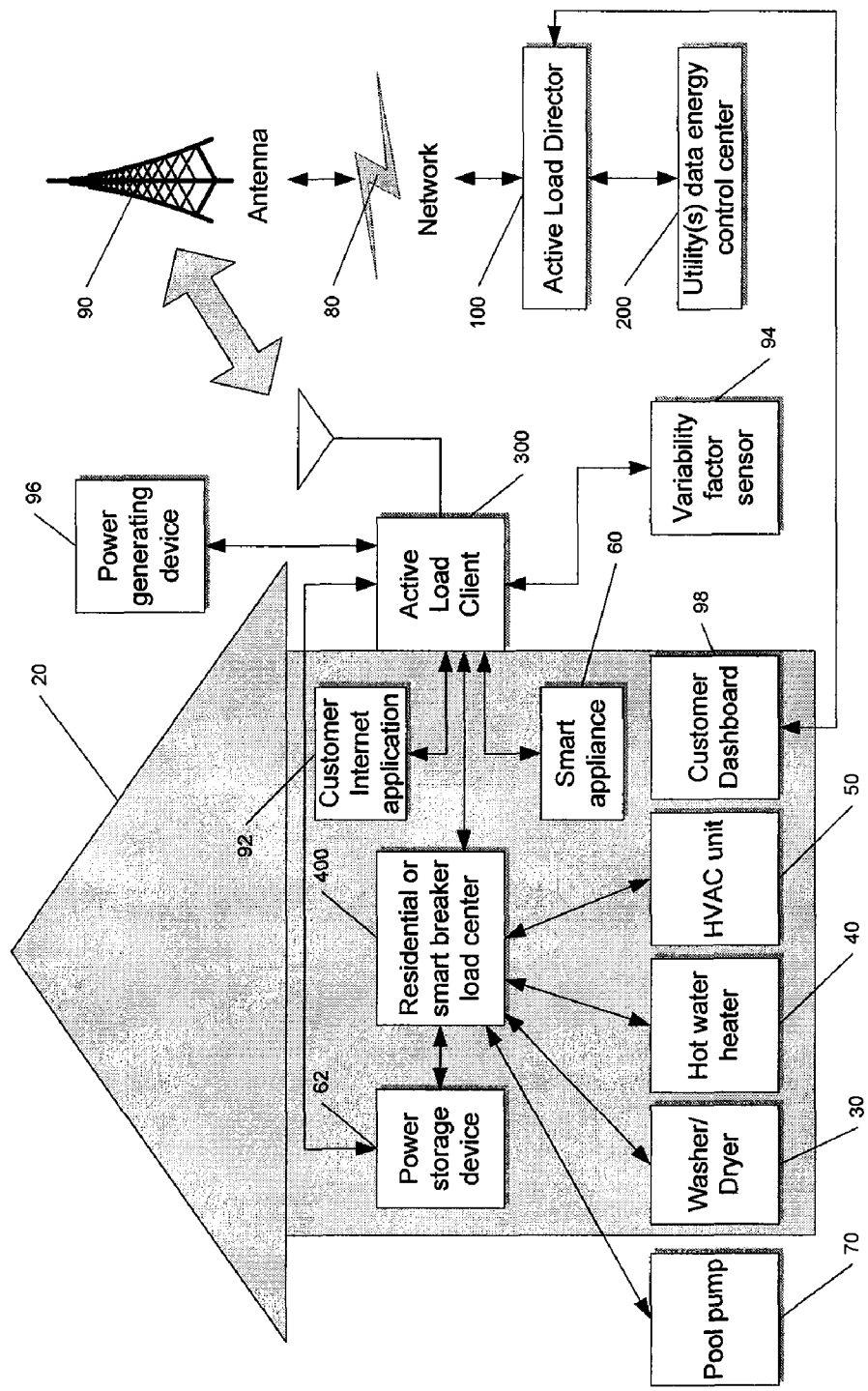
FIG. 1 is a block diagram of an exemplary IP-based, Active Load Management System (ALMS).

Before describing in detail exemplary embodiments, it should be observed that the embodiments described reside primarily in combinations of apparatus components and processing steps related to actively managing power loading on an individual subscriber or service point basis, determining the customer profile of individual devices aggregated to related service points, and optionally tracking power savings incurred by both individual subscribers and an electric utility. Accordingly, the apparatus components and method steps have been represented where appropriate by conventional symbols in the drawings, showing only those specific details that are pertinent to understanding the embodiments disclosed so as not to obscure the disclosure with details that will be readily apparent to those of ordinary skill in the art having the benefit of the description herein.

The term "electric utility" refers to any entity that generates and distributes electrical power to its customers, that purchases power from a power-generating entity and distributes the purchased power to its customers, or that supplies electricity created by alternative energy sources, such as solar power, wind power or otherwise, to power generation or distribution entities through the Federal Energy Regulatory Commission (FERC) electrical grid or otherwise.

Embodiments of the invention include a number of novel concepts, including a customer profile, drift, and intelligent load rotation as more fully described below. A customer profile captures patterns of power consumption for each customer. The drift concept includes a method for calculating drift, which is important in estimating power savings within thermal control devices. The intelligent load rotation concept includes a method for selecting customers for utility-initiated control events using intelligent load rotation.

The embodiments described utilize concepts disclosed in commonly-owned published patent application US 2009/0062970, entitled "System and Method for Active Power Load Management" which is incorporated by reference in its entirety herein. The following paragraphs describe the Active Management Load System (ALMS), Active Load Director (ALD), and Active Load Client (ALC) in sufficient detail to assist the reader in the understanding of the embodiments described herein. More detailed description of the ALMS, ALD, and ALC can be found in US 2009/0062970.

It should be noted that control events and other messaging used in embodiments of the invention include regulated load management messages. Regulated load management messages contain information used to apply control of the electric supply to individual appliances or equipment on customer premises. The load to be controlled includes native load and operating reserves including regulating, spinning, and non-spinning types.

Active Load Management System

FIG. 1 depicts an exemplary IP-based Active Load Management System (ALMS) 10 that may be utilized by a utility in the embodiments described herein. The exemplary ALMS 10 monitors and manages power distribution via an active load director (ALD) 100 connected between one or more utility control centers (UCCs) 200 and one or more Active Load Clients (ALCs) 300. The ALD 100 may communicate with the utility control center 200 and each active load client 300 either directly or through a network 80 using the Internet Protocol (IP) or any other connection-based protocols. For example, the ALD 100 may communicate using RF systems operating via one or more base stations 90 using one or more well-known wireless communication protocols. Alternatively, or additionally, the ALD 100 may communicate via a digital subscriber line (DSL) capable connection, cable television based IP capable connection, or any combination thereof. In the exemplary embodiment shown in FIG. 1, the ALD 100 communicates with one or more active load clients 300 using a combination of traditional IP-based communication (e.g., over a trunked line) to a base station 90 and a wireless channel implementing the WiMax protocol for the "last mile" from the base station 90 to the active load client 300.

Each ALC 300 is accessible through a specified address (e.g., IP address) and controls and monitors the state of individual smart breaker modules or intelligent appliances 60 installed in the business or residence 20 to which the ALC 300 is associated (e.g., connected or supporting). Each ALC 300 is associated with a single residential or commercial customer. In one embodiment, the ALC 300 communicates with a residential load center 400 that contains smart breaker modules, which are able to switch from an "ON" (active) state to an "OFF" (inactive) state, and vice versa, responsive to signaling from the ALC 300. Typically, each smart breaker controls a single appliance (e.g., a washer/dryer 30, a hot water heater 40, an HVAC unit 50, or a pool pump 70).

Additionally, the ALC 300 may control individual smart appliances directly (e.g., without communicating with the residential load center 400) via one or more of a variety of known communication protocols (e.g., IP, Broadband over Power Line (BPL) in various forms, including through specifications promulgated or being developed by the HOMEPLUG Powerline Alliance and the Institute of Electrical and Electronics Engineers (IEEE), Ethernet, Bluetooth, ZigBee, Wi-Fi, WiMax, etc.). Typically, a smart appliance 60 includes a power control module (not shown) having communication abilities. The power control module is installed in-line with the power supply to the appliance, between the actual appliance and the power source (e.g., the power control module is plugged into a power outlet at the home or business and the power cord for the appliance is plugged into the power control module). Thus, when the power control module receives a command to turn off the appliance 60, it disconnects the actual power supplying the appliance 60. Alternatively, a smart appliance 60 may include a power control module integrated directly into the appliance, which may receive commands and control the operation of the appliance directly (e.g., a smart thermostat may perform such functions as raising or lowering the set temperature, switching an HVAC unit on or off, or switching a fan on or off).

Also as shown in FIG. 1, a service point 20 may have its own power generation on-site, including solar panels, fuel cells, or wind turbines. This is indicated by the power generating device 96. The power generating device 96 connects to the Active Load Client 300. Power that is added by the power generating device 96 is added to the overall utility capacity. The utility provides credit to the service point owner based on the energy produced at the service point.

The service point 20 also contains the Customer Dashboard 98. This is a web-based interface used by the customer to specify preferences for the use of the Active Load Management System at the customer's service point. These preferences include control event preferences, bill management preferences, and others.

Active Load Director

Figure 2:
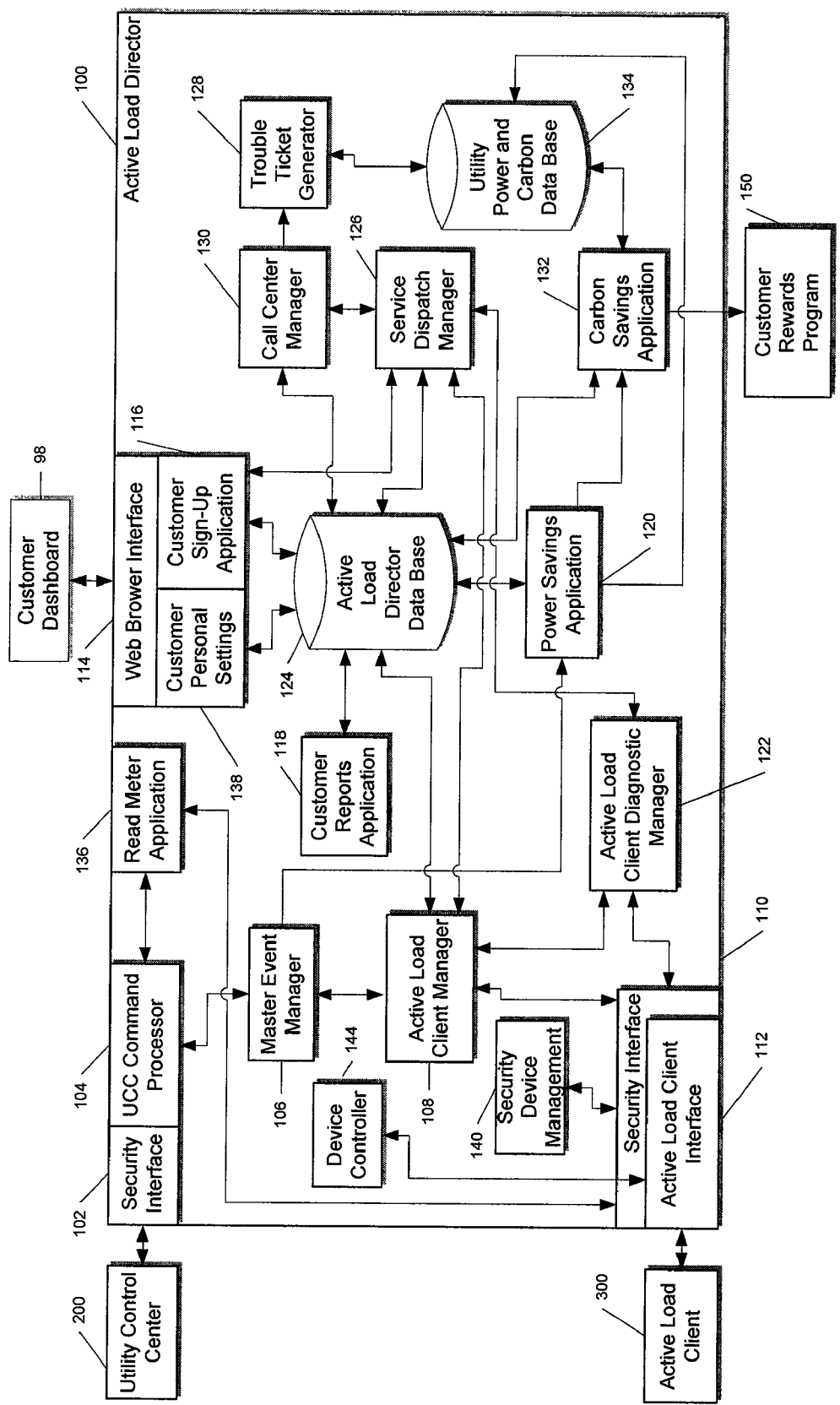
FIG. 2 is a block diagram illustrating an exemplary active load director (ALD) server included in the active load management system.

Referring now to FIG. 2, the ALD 100 may serve as the primary interface to customers, as well as to service personnel. In the exemplary embodiment depicted in FIG. 2, the ALD 100 includes a utility control center (UCC) security interface 102, a UCC command processor 104, a master event manager 106, an ALC manager 108, an ALC security interface 110, an ALC interface 112, a web browser interface 114, a customer sign-up application 116, customer personal settings 138, a customer reports application 118, a power savings application 120, an ALC diagnostic manager 122, an ALD database 124, a service dispatch manager 126, a trouble ticket generator 128, a call center manager 130, a carbon savings application 132, a utility power and carbon database 134, a read meter application 136, and a security device manager 140.

In one embodiment, customers interact with the ALD 100 using the web browser interface 114, and subscribe to some or all of the services offered by the power load management system 10 via a customer sign-up application 116. In accordance with the customer sign-up application 116, the customer specifies customer personal settings 138 that contain information relating to the customer and the customer's residence or business, and defines the extent of service to which the customer wishes to subscribe. Customers may also use the web browser interface 114 to access and modify information pertaining to their existing accounts.

The ALD 100 also includes a UCC security interface 102 which provides security and encryption between the ALD 100 and a utility company's control center 200 to ensure that no third party is able to provide unauthorized directions to the ALD 100. A UCC command processor 104 receives and sends messages between the ALD 100 and the utility control center 200. Similarly, an ALC security interface 110 provides security and encryption between the ALD 100 and each ALC 300 on the system 10, ensuring that no third parties can send directions to, or receive information from, the ALC 300. The security techniques employed by the ALC security interface 110 and the UCC security interface 102 may include conventional symmetric key or asymmetric key algorithms, or proprietary encryption techniques.

The master event manager 106 maintains the overall status of the power load activities controlled by the power management system 10. The master event manager 106 maintains a separate state for each utility that is controlled and tracks the current power usage within each utility. The master event manager 106 also tracks the management condition of each utility (e.g., whether or not each utility is currently being managed). The master event manager 106 receives instructions in the form of transaction requests from the UCC command processor 104 and routes instructions to components necessary to complete the requested transaction, such as the ALC manager 108 and the power savings application 120.

The ALC manager 108 routes instructions between the ALD 100 and each ALC 300 within the system 10 through an ALC interface 112. For instance, the ALC manager 108 tracks the state of every ALC 300 serviced by specified utilities by communicating with the ALC 300 through an individual IP address. The ALC interface 112 translates instructions (e.g., transactions) received from the ALC manager 108 into the proper message structure understood by the targeted ALC 300 and then sends the message to the ALC 300. Likewise, when the ALC interface 112 receives messages from an ALC 300, it translates the message into a form understood by the ALC manager 108 and routes the translated message to the ALC manager 108.

The ALC manager 108 receives from each ALC 300 that it services, either periodically or responsive to polling messages sent by the ALC manager 108, messages containing the present power consumption and the status (e.g., "ON" or "OFF") of each device controlled by the ALC 300. Alternatively, if individual device metering is not available, then the total power consumption and load management status for the entire ALC 300 may be reported. The information contained in each status message is stored in the ALD database 124 in a record associated with the specified ALC 300. The ALD database 124 contains all the information necessary to manage every customer account and power distribution. In one embodiment, the ALD database 124 contains customer contact information and associated utility companies for all customers having ALCs 300 installed at their residences or businesses, as well as a description of specific operating instructions for each managed device (e.g., IP-addressable smart breaker or appliance), device status, and device diagnostic history.

Another message that can be exchanged between an ALC 300 and the ALC manager 108 is a status response message. A status response message reports the type and status of each device controlled by the ALC 300 to the ALD 100. When a status response message is received from an ALC 300, the ALC manager 108 logs the information contained in the message in the ALD database 124.

In one embodiment, upon receiving instructions (e.g., a "Cut" instruction) from the master event manager 106 to reduce power consumption for a specified utility, the ALC manager 108 determines which ALCs 300 and/or individually controlled devices to switch to the "OFF" state based upon present power consumption data stored in the ALD database 124. The ALC manager 108 then sends a message to each selected ALC 300 containing instructions to turn off all or some of the devices under the ALC's control.

A read meter application 136 may be optionally invoked when the UCC command processor 104 receives a "Read Meters" or equivalent command from the utility control center 200. The read meter application 136 cycles through the ALD database 124 and sends a read meter message or command to each ALC 300, or to ALCs 300 specifically identified in the UCC's command, via the ALC manager 108. The information received by the ALC manager 108 from the ALC 300 is logged in the ALD database 124 for each customer. When all the ALC meter information has been received, the information is sent to the requesting utility control center 200 using a business to business (e.g., ebXML) or other desired protocol.

Active Load Client

Figure 3:
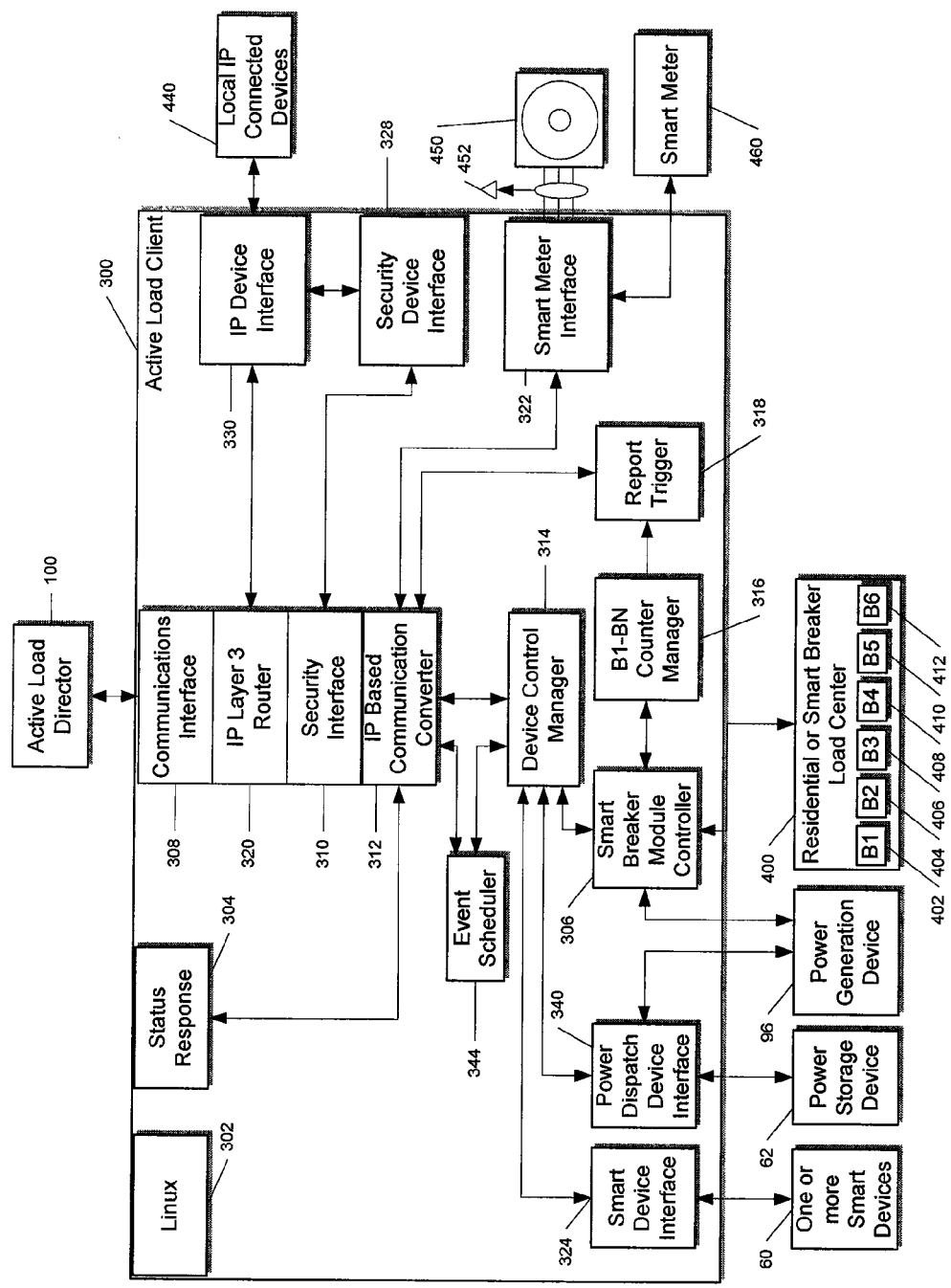
FIG. 3 is a block diagram illustrating an exemplary active load client (ALC) included in the active load management system.

FIG. 3 illustrates a block diagram of an exemplary active load client 300 in accordance with one embodiment of the present invention. The depicted active load client 300 includes a smart breaker module controller 306, a communications interface 308, a security interface 310, an IP-based communication converter 312, a device control manager 314, a smart breaker (B1-BN) counter manager 316, an IP router 320, a smart meter interface 322, a smart device interface 324, an IP device interface 330, and a power dispatch device interface 340. The active load client 300, in this embodiment, is a computer or processor-based system located on-site at a customer's residence or business. The primary function of the active load client 300 is to manage the power load levels of controllable, power consuming load devices located at the residence or business, which the active load client 300 oversees on behalf of the customer. In an exemplary embodiment, the active load client 300 may include dynamic host configuration protocol (DHCP) client functionality to enable the active load client 300 to dynamically request IP addresses for itself and/or one or more controllable devices 402-412, 60 managed thereby from a DHCP server on the host IP network facilitating communications between the active load client 300 and the ALD 100. The active load client 300 may further include router functionality and maintain a routing table of assigned IP addresses in a memory of the active load client 300 to facilitate delivery of messages from the active load client 300 to the controllable devices 402-412, 60. Finally, the power generation device 96 at the service point 20 sends data about power generated to the power dispatch device interface 340.

A communications interface 308 facilitates connectivity between the active load client 300 and the ALD server 100. Communication between the active load client 300 and the ALD server 100 may be based on any type of IP or other connection protocol including, but not limited to, the WiMax protocol. Thus, the communications interface 308 may be a wired or wireless modem, a wireless access point, or other appropriate interface.

A standard IP Layer-3 router 320 routes messages received by the communications interface 308 to both the active load client 300 and to any other locally connected device 440. The router 320 determines if a received message is directed to the active load client 300 and, if so, passes the message to a security interface 310 to be decrypted. The security interface 310 provides protection for the contents of the messages exchanged between the ALD server 100 and the active load client 300. The message content is encrypted and decrypted by the security interface 310 using, for example, a symmetric encryption key composed of a combination of the IP address and GPS data for the active load client 300 or any other combination of known information. If the message is not directed to the active load client 300, then it is passed to the IP device interface 330 for delivery to one or more locally connected devices 440. For example, the IP router 320 may be programmed to route power load management system messages as well as conventional Internet messages. In such a case, the active load client 300 may function as a gateway for Internet service supplied to the residence or business instead of using separate Internet gateways or routers.

An IP based communication converter 312 opens incoming messages from the ALD server 100 and directs them to the appropriate function within the active load client 300. The converter 312 also receives messages from various active load client 300 functions (e.g., a device control manager 314, a status response generator 304, and a report trigger application 318), packages the messages in the form expected by the ALD server 100, and then passes them on to the security interface 310 for encryption.

The device control manager 314 processes power management commands for various controllable devices logically connected to the active load client 300. The devices can be either smart breakers 402-412 or other IP based devices 60, 460, such as smart appliances with individual control modules (not shown). The device control manager 314 also processes "Query Request" or equivalent commands or messages from the ALD server 100 by querying a status response generator 304 which maintains the type and status of each device controlled by the active load client 300, and providing the status of each device to the ALD server 100.

The status response generator 304 receives status messages from the ALD server 100 and, responsive thereto, polls each controllable device 402-412, 60, 460 under the active load client's control to determine whether the controllable device 402-412, 60, 460 is active and in good operational order. Each controllable device 402-412, 60, 460 responds to the polls with operational information (e.g., activity status and/or error reports) in a status response message. The active load client 300 stores the status responses in a memory associated with the status response generator 304 for reference in connection with power reduction events.

The smart device interface 324 facilitates IP or other address-based communications to individual devices 60 (e.g., smart appliance power control modules) that are attached to the active load client 300. The connectivity can be through one of several different types of networks including, but not limited to, BPL, ZigBee, Wi-Fi, Bluetooth, or direct Ethernet communications. Thus, the smart device interface 324 is a modem adapted for use in or on the network connecting the smart devices 60 to the active load client 300.

The smart breaker module controller 306 formats, sends, and receives messages to and from the smart breaker module 400. In one embodiment, the communications is preferably through a BPL connection. In such embodiment, the smart breaker module controller 306 includes a BPL modem and operations software. The smart breaker module 400 contains individual smart breakers 402-412, wherein each smart breaker 402-412 includes an applicable modem (e.g., a BPL modem when BPL is the networking technology employed) and is preferably in-line with power supplied to a single appliance or other device. The B1-BN counter manager 316 determines and stores real time power usage for each installed smart breaker 402-412. For example, the counter manager 316 tracks or counts the amount of power used by each smart breaker 402-412 and stores the counted amounts of power in a memory of the active load client 300 associated with the counter manager 316.

The smart meter interface 322 manages either smart meters 460 that communicate using BPL or a current sensor 452 connected to a traditional power meter 450. When the active load client 300 receives a "Read Meters" command or message from the ALD server 100 and a smart meter 460 is attached to the active load client 300, a "Read Meters" command is sent to the meter 460 via the smart meter interface 322 (e.g., a BPL modem). The smart meter interface 322 receives a reply to the "Read Meters" message from the smart meter 460, formats this information along with identification information for the active load client 300, and provides the formatted message to the IP based communication converter 312 for transmission to the ALD server 100.

Customer Profiles

The embodiments disclosed make use of the "customer profiles" concept. The ALMS enables data to be gathered to generate a profile of each customer, including information about controllable energy consuming devices, and the related individual structures or service points. Customer profiles reside within the Active Load Director Database 124 in the Active Load Director 100. Included in this customer profile is the customer's pattern of energy consumption.

The customer profile includes, but is not limited to, the following: (1) customer name; (2) customer address; (3) geodetic location; (4) meter ID; (5) customer programs (possibly including program history); (6) device information, including device type and manufacturer/brand; (7) customer energy consumption patterns; and (8) connection and disconnection profile. The connection/disconnection profile can include service priority (i.e., elderly, police, etc.) and disconnection instructions.

The customer profile is created by using data gathered from within the ALMS. Data gathered or calculated includes, but is not be limited to, the following: (1) set points; (2) energy and average energy used in a given time period; (3) energy and average energy saved in a given time period; (4) drift time per unit temperature and average drift time; and (5) power time per unit temperature and average power time per unit temperature.

In other embodiments, additional data called "variability factors" may be captured by the ALMS as part of the customer profile, including, but not limited to, the following: (1) outside temperature, (2) sunlight, (3) humidity, (4) wind speed and direction, (5) elevation above sea level, (6) orientation of the service point structure, (7) duty duration and percentage, (8) set point difference, (9) current and historic room temperature, (10) size of structure, (11) number of floors, (12) type of construction (brick, wood, siding etc.) (13) color of structure, (14) type of roofing material and color, (15) construction surface of structure (built on turf, clay, cement, asphalt etc.), (16) land use (urban, suburban, rural), (17) latitude/longitude, (18) relative position to jet stream, (19) quality of power to devices, (20) number of people living in and/or using structure and (21) other environmental factors.

Additional factors may also be deemed necessary for determining unique energy consumption patterns and generating performance curves and data matrices for usage in load control events and other purposes detailed in this and related patent applications.

As part of the Active Load Directory (ALD), the methods described herein consolidate this information creating a historic energy consumption pattern reflecting the amount of energy used by each service point to maintain its normal mode of operation. This energy consumption pattern is part of a customer's profile.

Energy consumption patterns are subject to analysis that may be used for a variety of different types of activities. For example, based on the energy consumption patterns created from this data, the ALD will derive performance curves and/or data matrices for each service point to which the Active Load Management System is attached and determine the amount of energy reduction that can be realized from each service point. The ALD will create a list of service points through which energy consumption can be reduced via demand side management, interruptible load, or spinning/regulation reserves. This information can be manipulated by the ALD processes to create a prioritized, rotational order of control, called "intelligent load rotation" which is described in detail below. This rotational shifting of the burden of the interruptible load has the practical effect of reducing and flattening the utility load curve while allowing the serving utility to effectively group its customers within the ALD or its own databases by energy efficiency.

The practical application of this data is that in load control events, a utility can determine the most efficient service points to dispatch energy from, or more importantly derive the most inefficient service points (e.g., homes, small businesses, communities, structures, or devices) within the utility's operating territory. Based on this information, highly targeted conservation programs could have an immediate impact to improve energy efficiency. From a marketing perspective, this is invaluable information because it contains the comfort preference of a service point compared against the capabilities of the service point's energy consuming devices, or the lack of efficiency of those devices. From a national security point of view, the profiles could be used to determine habits of monitored end customers in a similar fashion to how Communications Assistance for Law Enforcement Act (CALEA) is used by law enforcement for wire-tapping. Utilities may use energy consumption patterns to categorize or group customers for service, control event, marketing, sales, or other purposes. Other uses of energy consumption patterns are possible that determine or predict customer behavior.

Generally, the embodiments described encompass a closed loop system and method for creating a customer profile, calculating and deriving patterns of energy drift, and making use of those patterns when implemented through the machinery of a system comprised of load measurement devices combined with the physical communications link and when these inputs are manipulated through a computer, processor, memory, routers and other necessary machines as those who are skilled in the art would expect to be utilized.

Drift

The embodiments described also make use of the concept of "drift." The data gathered for the customer profile is used to empirically derive the decay rate or drift, temperature slope, or a dynamic equation ($f\{x\}$) whereby the service point (or device) will have a uniquely derived "fingerprint" or energy usage pattern.

Drift occurs when a climate-controlled device begins to deviate from a set point. This may occur both normally and during control events. Customers define the upper and lower boundaries of comfort in customer preferences, with the set point in the middle of those boundaries. During normal operation, a climate controlled device will attempt to stay near the device's set point. However, all devices have a duty cycle that specifies when the device is in operation because many devices are not continuously in operation. For a climate-controlled device, the duty cycle ends when the inside temperature reaches, or is within a given tolerance of, the set point. This allows the device to "drift" (upward or downward) toward a comfort boundary temperature. Once the boundary temperature is reached, the duty cycle begins again until the inside temperature reaches, or is within a given tolerance of, the set point which ends the duty cycle.

Therefore, drift is the time it takes for a climate-controlled device to move from the set point to the upper or lower comfort boundary. Drift is calculated and recorded for each service point and for each device associated with the service point. The inverse of drift is "power time" which is the time it takes for the device to move from the comfort boundary to the set point.

Drift may also occur during a control event. A control event is an action that reduces or terminates power consumption of a device. During a control event, a climate-controlled device will drift toward maximum or minimum control event boundaries (upper or lower) until it reaches that boundary which is normally outside the comfort boundary. Once it reaches the control event boundary, the ALMS returns power to the device to enable it to reach the set point again.

As an example, an HVAC system may have a set point of 72° and a minimum and maximum temperature of 68° and 76°, respectively. On a cold day, a control event would cause the HVAC system to begin to lose power and move toward the minimum temperature. Once the structure reaches the minimum temperature, the control event would end, and power would be restored to the HVAC system, thus causing the temperature to rise toward the preferred temperature. A similar but opposite effect would take place on a warm day.

In some embodiments, drift, as well as other measurements available from the active load director data base 124, are used to create an energy consumption pattern for each service point. Additional measurements may include vacancy times, sleep times, times in which control events are permitted, as well as variability factors referred to previously.

A device that resides within an energy-efficient structure will have a tendency to cool or heat more slowly, thus exhibiting a lower rate of drift. These devices may be subject to control events for longer periods of time, commensurate with the rate of drift, because it takes them longer to drift to a comfort boundary.

In another embodiment, the active load director server 100 identifies service points that have an optimum drift for power savings. The power savings application 120 calculates drift for each service point and saves that information in the active load director data base 124.

Intelligent Load Rotation

The embodiments disclosed also make use of the "intelligent load rotation" concept. Intelligent load rotation uses machine intelligence to ensure that the same service points are not always selected for control events, but distributes control events over a service area in some equitable way.

There are a variety of ways in which intelligent load rotation may be implemented. In one embodiment of intelligent load rotation, service points are simply selected in a sequential list until the end is reached, after which selection starts at the top of the list again. This is a fairly straightforward approach that may be implemented by any one skilled in the art.

Figure 6:
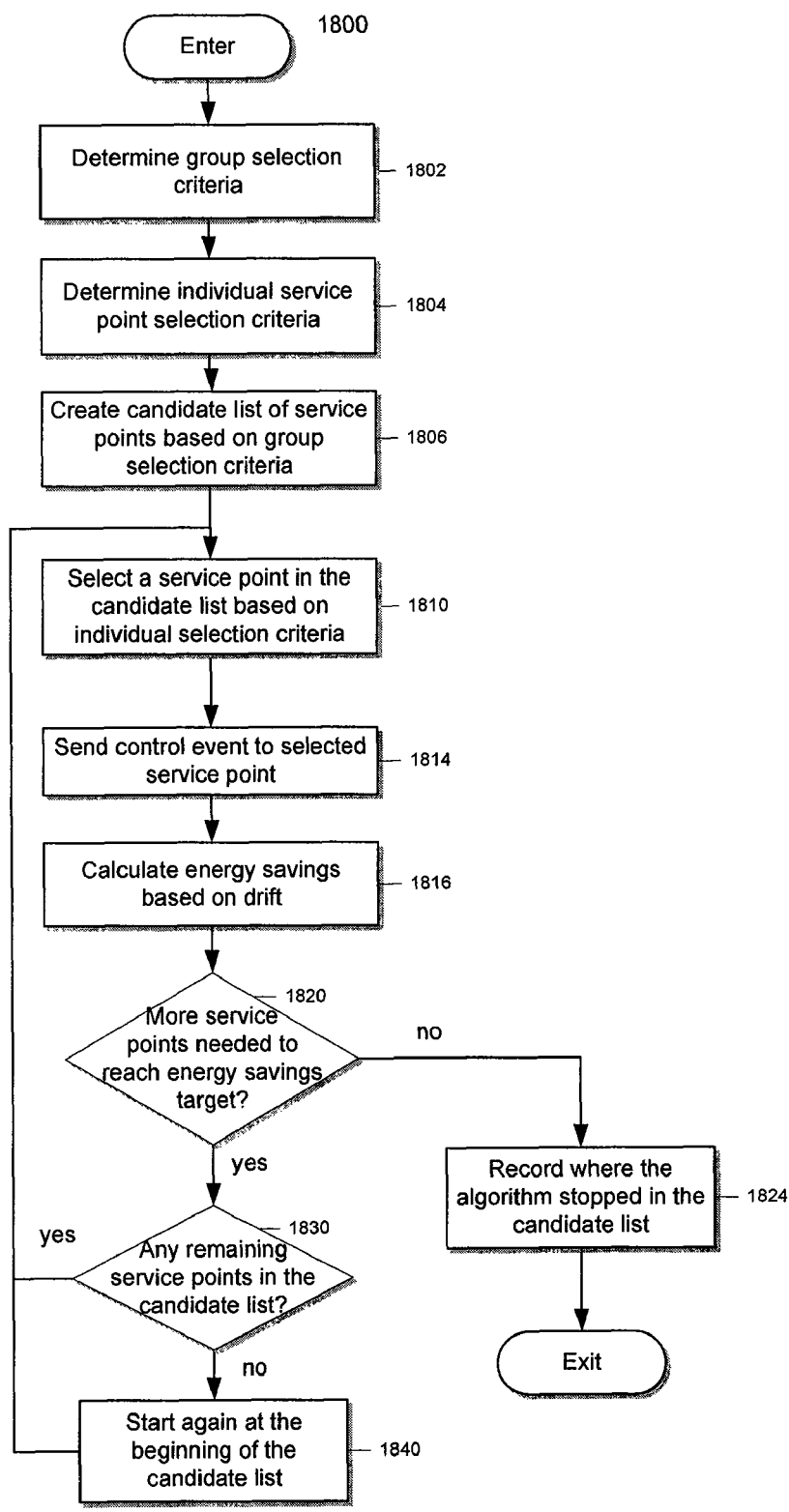
FIG. 6 is an operational flow diagram illustrating an exemplary Intelligent Load Rotation algorithm.

FIG. 6 illustrates an operational flow diagram of the basic intelligent load rotation algorithm 1800. All other embodiments of intelligent load rotation are based on this embodiment. In general, the algorithm goes through each service point within a group of service points, and sends control events to each of those service points until enough energy savings have been obtained.

In its most basic form, the algorithm first identifies a group selection criteria as indicated in logic block 1802. This may be as simple as all service points or may be more complex, such as selecting service points within a specified drift or within a specified geographic area. The group selection criteria may include, but is not limited to, any of the following: (1) random selection of service points; (2) drift; (3) grouping of logical geodetic points by a utility; (4) efficiency rating of appliances; (5) ALD customer preferences; (6) capacity of devices; (7) proximity to transmission lines; (8) pricing signals (both dynamic and static); and (9) service priority, based upon an emergency situation (i.e. fire, police, hospital, elderly, etc.).

The algorithm then identifies an individual service point selection criterion as indicated in logic block 1804. This is the criterion for selecting individual service points within a group. In its simplest embodiment, this criterion involves sequential selection of service points within the group. Other criteria may include random selection, selection based on number of previous control events, or other criteria.

Next, the algorithm creates a candidate list of service points based on the group selection criteria as indicated in logic block 1806. From this list, the algorithm selects a service point based on the individual service point selection criteria as indicated in logic block 1810. The ALMS then sends a control event to the selected service point as indicated in logic block 1814, and calculates the energy savings of that control event based on drift calculation as indicated in block 1816. The algorithm then determines if more energy savings are needed to reach the savings target as indicated in decision block 1820. If not, then the ALMS records where the algorithm ended in the candidate list as indicated in block 1824 and exits. If more energy savings are needed, then the ALMS determines if any more service points are in the candidate list as indicated in decision block 1830. If there are no more service points in the candidate list, then the algorithm returns to the beginning of the candidate list again in logic block 1840. Otherwise, if there are more service points in the candidate list, the algorithm simply returns to logic block 1810.

In an alternate embodiment, decision block 1820 may be modified to determine if more service points are to be selected from this group.

There are many other embodiments of intelligent load rotation. Many embodiments are based on the group selection criteria. Service points may be grouped by geography or some other common characteristic of service points. For example, groups might include "light consumers" (because they consume little energy), "daytime consumers" (because they work at night), "swimmers" (for those who have a pool and use it), or other categories. These categories are useful to the utility for quickly referring to customers with specific energy demographics. The utility may then select a number of service points in each group for control events to spread control events among various groups.

In another embodiment, optimum drift can be used as the group selection criteria. Because those service points will use the least energy, the utility may want to select those service points that are the most energy efficient.

In another embodiment, a group of service points is selected that have had the fewest control events in the past. This ensures that service points with the most control events in the past will be bypassed in favor of those who have received fewer control events.

Figure 4:
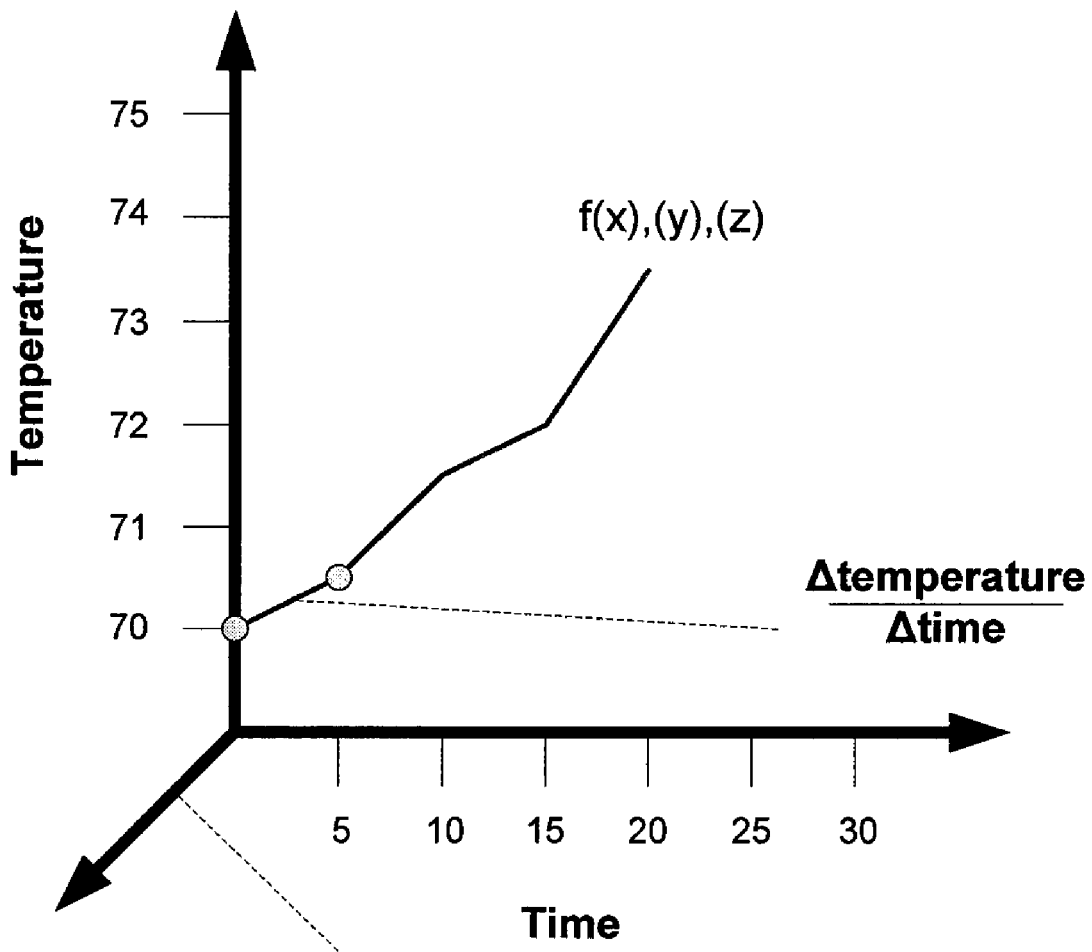
FIG. 4 is a graph illustrating how drift is calculated.
Figure 5:
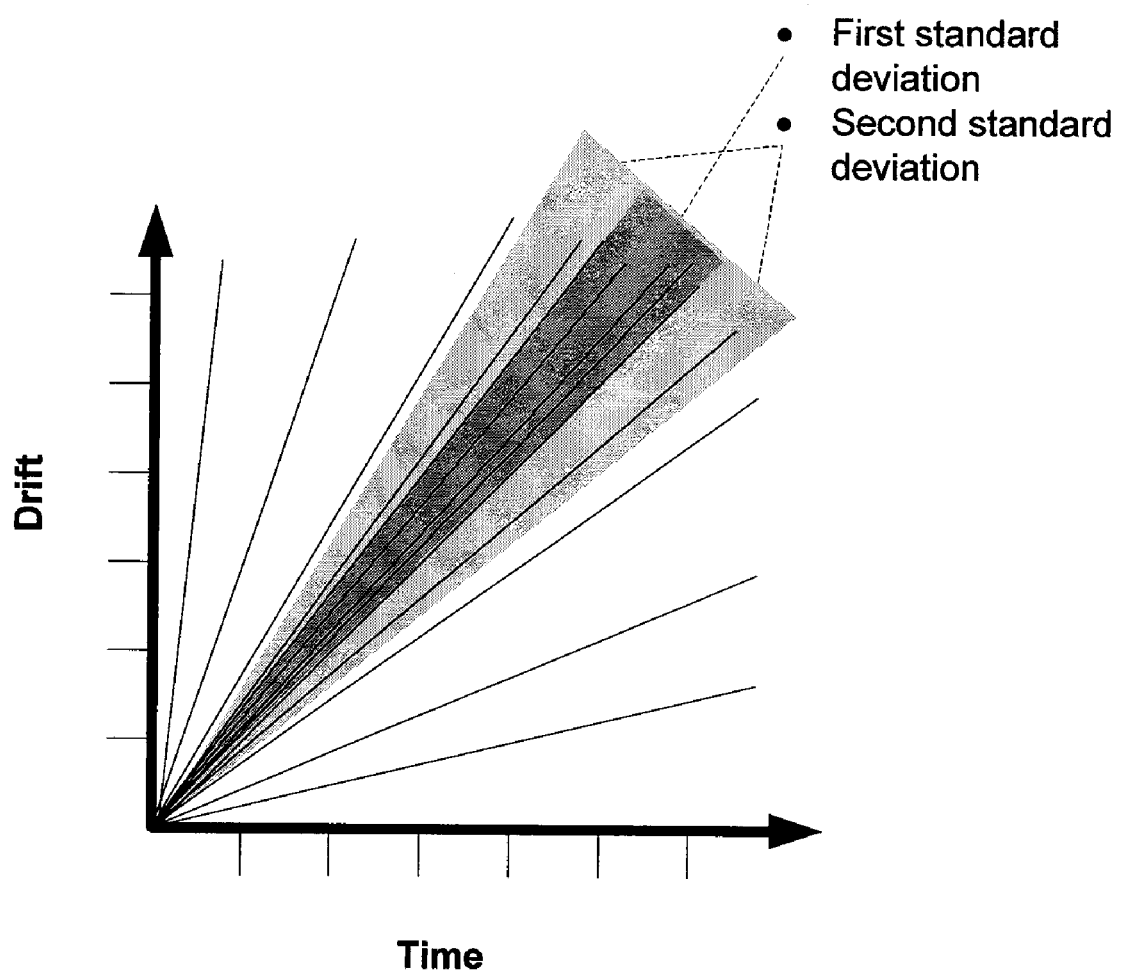
FIG. 5 is a graph illustrating how service points are selected for optimal drift.

In another embodiment, with reference to FIGS. 4-5, drift is used as a means of intelligent load rotation. As data is collected by the ALMS, it is possible to calculate the total drift of a device over time, as shown in FIG. 4. The calculation for one service point represents one vector on the graph. Each vector represents the drift for a single service point. To identify the service points with the optimal drift, the ALD 100 determines the median drift and all service points having a drift that is within one standard deviation away from that median. That represents the shaded area in the graph depicted in FIG. 5. If sufficient service points cannot be found that are within one standard deviation, then the second standard deviation can be selected.

In another embodiment, energy consumption patterns in customer profiles are used to identify service points that are the best targets for excess power sharing. This would occur when renewable energy such as solar or wind is added to the grid, resulting in power that cannot be compensated for by the grid. This could occur, for example, on very windy days. When this happens, utilities are faced with the problem of what to do with the excess energy. Instead of cutting power to service points in order to affect power savings, a utility could add energy to service points in order to effect power dissipation. The service points selected by the utility may be different (or even the inverse) of those selected for power savings. The devices at these service points would be turned on if they were off or set points for climate-controlled devices would be adjusted to heat or cool more than normal. Spread out over many control points, this can provide the energy dissipation needed.

In a further embodiment, energy consumption patterns within customer profiles could be used to identify opportunities for up selling, down selling, or cross selling. These opportunities may be determined by the power utility or by its partners. Data from customer profiles may be used to provide insights on inefficient devices, defective devices, or devices that require updating to meet current standards. Customer profile data may also be used to identify related sales opportunities. For example, if energy consumption patterns suggest that the customer may be very interested in personal energy conservation, then sales efforts could be directed toward that individual concerning products related to that lifestyle. This information can be used by the utility or its partners to provide incentives to customers to buy newer, updated devices, or obtain maintenance for existing devices. The customer is given the option to opt out of having his customer profile used for sales and marketing efforts, or for regulating energy conservation. The customer profile makes use of open standards (such as the CPExchange standard) that specify a privacy model with the customer profile. The use of consumption patterns in this manner is governed by national, state, or local privacy laws and regulations.

A further embodiment of using customer profiles to identify sales opportunities involves the use of device information to create incentives for customers to replace inefficient devices. By identifying the known characteristics and/or behavior of devices within a service point, the invention identifies those customers who may benefit from replacement of those devices. The invention estimates a payback period for replacement. This information is used by the ALMS operator to create redemptions, discounts, and campaigns to persuade customers to replace their devices.

It should be noted that many terms and acronyms are used in this description that are well-defined in the telecommunications and computer networking industries and are well understood by persons skilled in these arts. Complete descriptions of these terms and acronyms, whether defining a telecommunications standard or protocol, can be found in readily available telecommunications standards and literature and are not described in any detail herein.

As used in the foregoing description, the term "ZigBee" refers to any wireless communication protocol adopted by the Institute of Electrical and Electronics Engineers (IEEE) according to standard 802.15.4 or any successor standard(s), and the term "Bluetooth" refers to any short-range communication protocol implementing IEEE standard 802.15.1 or any successor standard(s). The term "High Speed Packet Data Access (HSPA)" refers to any communication protocol adopted by the International Telecommunication Union (ITU) or another mobile telecommunications standards body referring to the evolution of the Global System for Mobile Communications (GSM) standard beyond its third generation Universal Mobile Telecommunications System (UMTS) protocols. The term "Long Term Evolution (LTE)" refers to any communication protocol adopted by the ITU or another mobile telecommunications standards body referring to the evolution of GSM-based networks to voice, video and data standards anticipated to be replacement protocols for HSPA. The term "Code Division Multiple Access (CDMA) Evolution Date-Optimized (EVDO) Revision A (CDMA EVDO Rev. A)" refers to the communication protocol adopted by the ITU under standard number TIA-856 Rev. A.

It will be appreciated that embodiments or components of the systems described herein may be comprised of one or more conventional processors and unique stored program instructions that control the one or more processors to implement, in conjunction with certain non-processor circuits, some, most, or all of the functions for managing power load distribution, and tracking and controlling individual subscriber power consumption and savings in one or more power load management systems. The non-processor circuits may include, but are not limited to, radio receivers, radio transmitters, antennas, modems, signal drivers, clock circuits, power source circuits, relays, meters, smart breakers, current sensors, and customer input devices. As such, these functions may be interpreted as steps of a method to distribute information and control signals between devices in a power load management system. Alternatively, some or all functions could be implemented by a state machine that has no stored program instructions, or in one or more application specific integrated circuits (ASICs), in which each function or some combinations of functions are implemented as custom logic. Of course, a combination of the two approaches could be used. Thus, methods and means for these functions have been described herein. Further, it is expected that one of ordinary skill in the art, notwithstanding possibly significant effort and many design choices motivated by, for example, available time, current technology, and economic considerations, when guided by the concepts and principles disclosed herein, will be readily capable of generating such software instructions, programs and integrated circuits (ICs), and appropriately arranging and functionally integrating such non-processor circuits, without undue experimentation.

In the foregoing specification, the invention has been described with reference to specific embodiments. However, one of ordinary skill in the art will appreciate that various modifications and changes may be made without departing from the scope of the present invention as set forth in the appended claims. Accordingly, the specification and drawings are to be regarded in an illustrative rather than a restrictive sense, and all such modifications are intended to be included within the scope of the present invention.

The corresponding structures, materials, acts, and equivalents of all means plus function elements in any claims below are intended to include any structure, material, or acts for performing the function in combination with other claim elements as specifically claimed.

In addition, it is possible to use some of the features of the embodiments disclosed without the corresponding use of the other features. Accordingly, the foregoing description of the exemplary embodiments is provided for the purpose of illustrating the principles of the invention, and not in limitation thereof, since the scope of the present invention is defined solely by the appended claims.

What is claimed is:

1. A method for determining and using customer energy profiles to manage electrical load control events on a communications network between a server in communication with an electric utility and a client device at each of a plurality of service points, comprising the steps of:

generating, at the server, a customer profile for each of a plurality of customers including at least energy consumption information for a plurality of controllable energy consuming devices at an associated service point;

storing the plurality of customer profiles in a database at the server for use in load control events;

aggregating the plurality of customer profiles into a plurality of groups based on at least one predetermined criterion;

generating, at the server, a candidate list of service points for load control events based on the predetermined criterion;

sending a load control event to at least one selected service point in the candidate list of service points in response to an energy reduction request including a target energy savings received from the electric utility via the communications network;

determining, at the server, an energy savings for the plurality of controllable energy consuming devices resulting from the load control event at the selected service point;

determining, at the server, if the resulting energy savings is at least equal to the target energy savings; and sending the load control event to at least one selected additional service point in the candidate list of service points in order to reach the target energy savings.

2. The method for determining and using customer energy profiles of claim 1 further comprising determining a individual service point selection criterion for each of a plurality of service points aggregated into each group.

3. The method for determining and using customer energy profiles of claim 2 further comprising selecting the at least one service point based on the individual service point criterion.

4. The method for determining and using customer energy profiles of claim 2 wherein the individual service point criterion includes any one of a sequential selection, a random selection, and a selection based on a number of previous control events sent to the at least one service point.

5. The method for determining and using customer energy profiles of claim 1 wherein the predetermined criterion for aggregating the plurality of customer profiles into the plurality of groups includes any one of a random selection, a drift factor, a logical geodetic point, an efficiency rating for each controllable energy consuming device at an associated service point, a customer preference, a proximity to a transmission line, a pricing signal, and a priority for an emergency situation.

6. The method for determining and using customer energy profiles of claim 1 further comprising recording a location in the candidate list of service points at which the target energy savings is reached.

7. The method for determining and using customer energy profiles of claim 1 further comprising resuming sending load control events to at least one previously selected service point until the target energy savings is reached.

8. The method for determining and using customer energy profiles of claim 1 wherein the predetermined criterion for aggregating the plurality of customer profiles into the plurality of groups further includes any one of a low energy use customer, a day time energy user, a swimming pool energy user, or other categories of energy users.

9. The method for determining and using customer energy profiles of claim 1 wherein the customer profile further includes identification of any power generating device at the associated service point that can be added to an electrical power grid in response to a load control event sent to the service point.

10. The method for determining and using customer energy profiles of claim 1 wherein the customer profile for each of the plurality of customers further includes at least one of a customer name, a customer address, a meter identifier, and controllable device information for each of the plurality of energy consuming devices at the service point.

11. The method for determining and using customer energy profiles of claim 1 wherein the energy consumption information in each customer profile includes at least one of a set point for a climate-controlled device, an energy use in a specified time period, an energy savings in a specified time period, a drift time per unit temperature, a power time per unit temperature.

12. The method for determining and using customer energy profiles of claim 1 wherein the customer profile for each of the plurality of customers further includes a plurality of variability factors resulting in a unique energy consumption pattern at the associated service point.

13. The method for determining and using customer energy profiles of claim 1 further comprising determining a drift associated with each service point, wherein the drift is an amount of time for a climate-controlled device to move from a set point temperature to an upper or lower temperature boundary defined in the customer profile.

14. The method for determining and using customer energy profiles of claim 1 further comprising determining a power time associated with each service point, wherein the power time is an amount of time for a climate-controlled device to move from an upper or lower temperature boundary defined in the customer profile to a set point temperature.

15. The method for determining and using customer energy profiles of claim 11 wherein the set point is a temperature that is a midpoint between an upper and a lower temperature boundary defined in the customer profile for control events.

16. The method for determining and using customer energy profiles of claim 1 wherein a temperature associated with a climate-controlled device at the selected service point drifts towards a maximum or minimum temperature boundary during the load control event.

17. The method for determining and using customer energy profiles of claim 16 further comprising returning power to the climate-controlled device when either a maximum or a minimum temperature boundary is reached.

18. The method for determining and using customer energy profiles of claim 1 further comprising generating an energy consumption pattern for each service point that reflects an amount of energy used by each service point to maintain a normal mode of operation.

19. The method for determining and using customer energy profiles of claim 18 further comprising deriving a performance curve for each service point, and determining an amount of energy reduction that can be realized from the load control event at each service point.

20. The method for determining and using customer energy profiles of claim 1 further comprising applying the load control event to an inefficient controllable energy consuming device at the service point.

21. The method for determining and using customer energy profiles of claim 1 further comprising applying the load control event to a controllable energy consuming device at the service point having a low rate of drift, wherein the drift is an amount of time for a climate-controlled device to move from a set point temperature to an upper or lower temperature boundary defined in the customer profile.

22. The method for determining and using customer energy profiles of claim 21 further comprising applying the load control event to a controllable energy consuming device at the service point for a time that is commensurate with the rate of drift.

23. The method for determining and using customer energy profiles of claim 1 further comprising determining a device payback period for replacing at least one controllable energy consuming device at the service point.

24. The method for determining and using customer energy profiles of claim 9 further comprising sending a load control event to add energy to the plurality of service points to dissipate any excess energy added to the electrical power grid by power generating devices at associated service points.

25. A system for determining and using customer energy profiles to manage electrical load control events on a communications network between a server in communication with an electric utility and a client device at each of a plurality of service points, comprising:
a memory storing a database containing a plurality of customer profiles for load control events wherein each customer profile includes at least energy consumption information for a plurality of controllable energy consuming devices at an associated service point;
a server processor, cooperative with the memory, and configured for managing electrical load control events on the communications network to the plurality of service points by:
generating a customer profile for each of a plurality of customers;
aggregating the plurality of customer profiles into a plurality of groups based on at least one predetermined criterion;
generating a candidate list of service points for load control events based on the predetermined criterion;
sending a load control event to at least one selected service point in the candidate list of service points in response to an energy reduction request including a target energy savings received from the electric utility via the communications network;
determining an energy savings for the plurality of controllable energy consuming devices resulting from the load control event at the selected service point;
determining if the resulting energy savings is at least equal to the target energy savings; and
sending the load control event to at least one selected additional service point in the candidate list of service points in order to reach the target energy savings.

26. The system for determining and using customer energy profiles of claim 25 wherein the processor is further configured for selecting the at least one service point based on an individual service point criterion for each of a plurality of service points aggregated into each group.

27. The system for determining and using customer energy profiles of claim 26 wherein the individual service point criterion includes any one of a sequential selection, a random selection, and a selection based on a number of previous control events sent to the at least one service point.

28. The system for determining and using customer energy profiles of claim 25 wherein the predetermined criterion for aggregating the plurality of customer profiles into the plurality of groups includes any one of a random selection, a drift factor, a logical geodetic point, an efficiency rating for each controllable energy consuming device at an associated service point, a customer preference, a proximity to a transmission line, a pricing signal, and a priority for an emergency situation.

29. The system for determining and using customer energy profiles of claim 25 wherein the processor is further configured for recording a location in the candidate list of service points at which the target energy savings is reached.

30. The system for determining and using customer energy profiles of claim 25 wherein the processor is further configured for resuming sending load control events to at least one previously selected service point until the target energy savings is reached.

31. The system for determining and using customer energy profiles of claim 25 wherein the processor is further configured for identifying in the customer profile for a customer any power generating device at the associated service point that can be added to an electrical power grid in response to a load control event sent to the service point.

32. The system for determining and using customer energy profiles of claim 25 wherein the customer profile for each of the plurality of customers includes at least one of a customer name, a customer address, a meter identifier, and controllable device information for each of the plurality of energy consuming devices at the service point.

33. The system for determining and using customer energy profiles of claim 25 wherein the energy consumption information in each customer profile includes at least one of a set point for a climate-controlled device, an energy use in a specified time period, an energy savings in a specified time period, a drift time per unit temperature, a power time per unit temperature.

34. The system for determining and using customer energy profiles of claim 25 wherein the customer profile for each of the plurality of customers further includes a plurality of variability factors resulting in a unique energy consumption pattern at the associated service point.

35. The system for determining and using customer energy profiles of claim 25 wherein the processor is further configured for determining a drift associated with each service point, wherein the drift is an amount of time for a climate-controlled device to move from a set point temperature to an upper or lower temperature boundary defined in the customer profile.

36. The system for determining and using customer energy profiles of claim 25 wherein the processor is further configured for determining a power time associated with each service point, wherein the power time is an amount of time for a climate-controlled device to move from an upper or lower temperature boundary defined in the customer profile to a set point temperature.

37. The system for determining and using customer energy profiles of claim 33 wherein the set point is a temperature that is a midpoint between an upper and a lower temperature boundary defined in the customer profile for control events.

38. The system for determining and using customer energy profiles of claim 25 wherein a temperature associated with a climate-controlled device at the selected service point drifts towards a maximum or minimum temperature boundary during the load control event.

39. The system for determining and using customer energy profiles of claim 25 wherein the processor is further configured for returning power to the climate-controlled device when either a maximum or a minimum temperature boundary is reached.

40. The system for determining and using customer energy profiles of claim 25 wherein the processor is further configured for generating an energy consumption pattern for each service point that reflects an amount of energy used by each service point to maintain a normal mode of operation.

41. The system for determining and using customer energy profiles of claim 40 wherein the processor is further configured for deriving a performance curve for each service point, and determining an amount of energy reduction that can be realized from the load control event at each service point.

42. The system for determining and using customer energy profiles of claim 25 wherein the processor is further configured for applying the load control event to an inefficient controllable energy consuming device at the service point.

43. The system for determining and using customer energy profiles of claim 25 wherein the processor is further configured for applying the load control event to a controllable energy consuming device at the service point having a low rate of drift, wherein the drift is an amount of time for a climate-controlled device to move from a set point temperature to an upper or lower temperature boundary defined in the customer profile.

44. The system for determining and using customer energy profiles of claim 43 wherein the processor is further configured for applying the load control event to a controllable energy consuming device at the service point for a time that is commensurate with the rate of drift.

45. The system for determining and using customer energy profiles of claim 25 wherein the processor is further configured for determining a device payback period for replacing at least one controllable energy consuming device at the service point.

46. The system for determining and using customer energy profiles of claim 31 wherein the processor is further configured for sending a load control event to add energy to the plurality of service points to dissipate any excess energy added to the electrical power grid by power generating devices at associated service points.

* * * * *